US006047854A

United States Patent [19]
Demers et al.

[11] Patent Number: 6,047,854
[45] Date of Patent: Apr. 11, 2000

[54] BEAD DISPERSEMENT DEVICES

[75] Inventors: Robert Richard Demers; Satyam Choudary Cherukuri, both of Cranbury, N.J.

[73] Assignee: Sarnoff Corporation, Princeton, N.J.

[21] Appl. No.: 08/805,413

[22] Filed: Feb. 26, 1997

[51] Int. Cl.⁷ .................................................. B65G 59/00
[52] U.S. Cl. .......................... 221/129; 221/131; 221/208; 221/212; 221/252; 198/619
[58] Field of Search ..................... 221/208, 123, 221/124, 131, 129, 212, 258, 281, 135, 252; 198/619

[56] References Cited

U.S. PATENT DOCUMENTS

| 3,254,792 | 6/1966 | Danielson et al. | 221/258 |
| 4,384,658 | 5/1983 | Large | 221/212 |
| 5,190,136 | 3/1993 | Grecksch et al. | 198/619 |

FOREIGN PATENT DOCUMENTS

| 1017917 | 12/1952 | France | 221/212 |
| 403259820 | 11/1991 | Japan | 198/619 |

*Primary Examiner*—H. Grant Skaggs
*Attorney, Agent, or Firm*—William J. Burke

[57] ABSTRACT

The invention provides, among other things, bead dispenser for holding a charged bead and selectively dispensing the bead, the dispenser comprising: (a) a feeder channel having a lower outlet; (b) a bead selection escapement with a depression having an outer lip and located below the first lower outlet such that a bead exiting the lower outlet comes to rest in the depression; (c) a dispenser channel descending from the level of the lip, wherein the lip impedes a bead situated on the bead selection escapement from entering the dispenser channel; and a first dispensing electrode for creating an electromagnetic potential to pull or push the bead over the rim and into the dispenser channel.

17 Claims, 3 Drawing Sheets

SIDE EDGE VIEW

BEAD DISPERSEMENT DEVICES

The present invention is directed to devices for controlling the dispersement of beads or pellets, which beads or pellets can contain, for example, candidate bioactive agents such as pharmaceuticals, insecticides, herbicides, and the like.

Very recently, pharmaceutical companies and other developers of bioactive agents have begun to focus on a new agent discovery strategy that has been termed "combinatorial chemistry." This strategy typically seeks to systematically create multiple pools of compounds, with the member compounds of each of the pools being substantially non-overlapping. The mix of compounds in a pool can be for example known, or at least approximately determined based on the chemistry used to create the pool. The separate pools are tested for a particular bioactivity. Those pools having activity are used to design new pools that help identify functionalities and molecular architectures favorable for enhancing the bioactivity. This strategy has created very substantial libraries of compounds and mixtures of compounds, creating a challenge for those who seek to archive these libraries for use in different assays for identifying bioactivity. Additionally, discovery tools such as traditional chemistry and the use of natural product extracts purities have accumulated a growing repertoire of materials in need of systematic archiving.

The present invention introduces dispensing devices for automatically handling such archives wherein the candidate compounds are packaged in beads that are susceptible to acquiring and maintaining an electrostatic charge, especially when handled in a humidity-controlled environment. By the use of these devices, dispensing apparatuses can be constructed to allocate beads of bioactive agents into hundreds or thousands of receptacles where the candidate compounds can be dissolved and used, if necessary, as the source solution for a dilution protocol. The candidate compounds are then dispensed into an assay such as a drug discovery assay.

SUMMARY OF THE INVENTION

In a first embodiment, the invention provides a bead dispenser for holding a charged bead and selectively dispensing the bead, the dispenser comprising:

(1) a feeder channel having a lower outlet;

(2) a bead selection escapement with a depression having a lip and located below the lower outlet such that a bead exiting the lower outlet comes to rest in the depression;

(3) a dispenser channel descending from the level of the lip, wherein the lip impedes a bead situated on the bead selection escapement from entering the dispenser channel; and (4) a first dispensing electrode for creating an electromagnetic potential to pull or push the bead over the rim and into the dispenser channel. In one preferred embodiment, the dispenser further comprises a second dispensing electrode at which an electromagnetic potential of polarity opposite that created at the first dispensing electrode can be created thereby causing one of said dispensing electrodes to attract the bead while the other repulses the bead.

In a second embodiment, the invention provides a bead director for directing a charged bead to one of a least two selector channels, the director comprising:

(a) a feeder channel having a lower outlet;

(b) a bead selection escapement with a depression, defined by an outer lip, and located below the lower outlet such that a bead exiting the lower outlet comes to rest in the depression;

(c) a first selector channel descending from the level of the lip and in a first direction from the center of the depression;

(d) a second selector channel descending from the level of the lip and in a second direction, offset from the first direction, from the center of the depression; and (e) a first electrode for creating an electromagnetic field to pull or push the bead over the rim and into the first or second selector channel. Preferably, the bead director comprises a second electrode for creating an electromagnetic field to pull or push the bead over the rim and into the first or second selector channel. The preferred and alternative embodiments of the first embodiment can be applied to this second embodiment, and similarly the preferred and alternative embodiments of this second embodiment be applied to the first embodiment. Preferably, the first and second selector channels are on opposite sides of the bead selection escapement and the first and second electrodes can be oppositely charged to increase the electromagnetic forces directing a bead to either the first selector channel or second selector channel, with one electrode creating a pushing force and the other creating a pulling force. In one embodiment, the feeder channel comprises a charging electrode for inducing an electrostatic charge in the bead to be selected. The electrodes are typically under the control of an electronic controller connected to the director for controlling the electric potential at each electrode and thereby controlling the directing of a bead to a particular selector channel.

In a third embodiment, the invention provides a bead selector glideway for directing an electrostatically charged bead into one of at least two dispenser channels, the selector glideway comprising:

(i) a sloped channel having two rims and a bottom, the bottom having an angle of descent sufficient to cause beads inserted into the sloped channel to slide or roll down the sloped channel, wherein the sloped channel has a first outlet opening and a second outlet opening each situated above one of the rims;

(ii) a supply channel that supplies beads into the sloped channel at a part of the sloped channel where the bottom of the sloped channel has a higher elevation than it does at the locations of either the first outlet opening or the second outlet opening;

(iii) a first dispenser channel and second dispenser channel for each of the first outlet opening and the second outlet opening, respectively, the first dispenser channel descending from the first outlet opening and the second dispenser channel descending from the second outlet opening;

(iv) one or more first electrodes for pushing or pulling a bead over the rim at the first outlet opening so that the bead enters the first dispenser channel; and (v) one or more second electrodes for pushing or pulling a bead over the rim at the second outlet opening so that the bead enters the second dispenser channel. It will be recognized that reference to the rims and bottom of the sloped channel is for reference purposes only; for example, in many cases the rims and bottom will form a single, seamless whole. Preferably, there are at least two, and preferably more, supply channels located upstream of either the first or second outlet openings. Preferably, the angle of descent of the sloped channel is offset by from about 15° to about 45° from horizontal, more preferably by from about 20° to about 40°. In one embodiment, the first electrodes comprise an alpha first electrode and a beta first electrode wherein the alpha first electrode receives a positive potential and the corresponding beta first electrode receives a negative potential such that one will attract a bead in the selector glideway and the other will repel such a bead to push or pull the bead over the rim of the first outlet opening and into the first selector channel.

Preferably, the devices described above are incorporated in a bead handling device such as a bead archival device, meaning a device for systematically storing and retrieving beads, which beads typically serve as a reservoir for a chemical or a mixture of chemicals.

DETAILED DESCRIPTION

First Embodiment

Figure 1C:
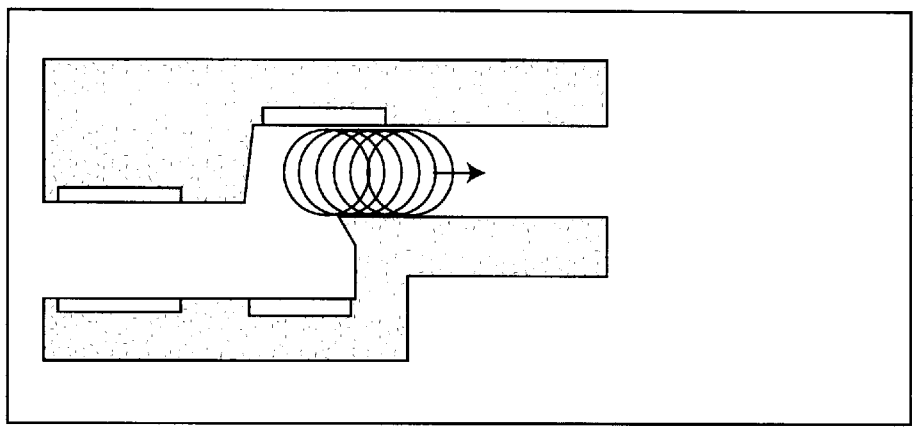
FIGS. 1A to 1C display an example of the first embodiment bead dispenser.
Figure 1B:
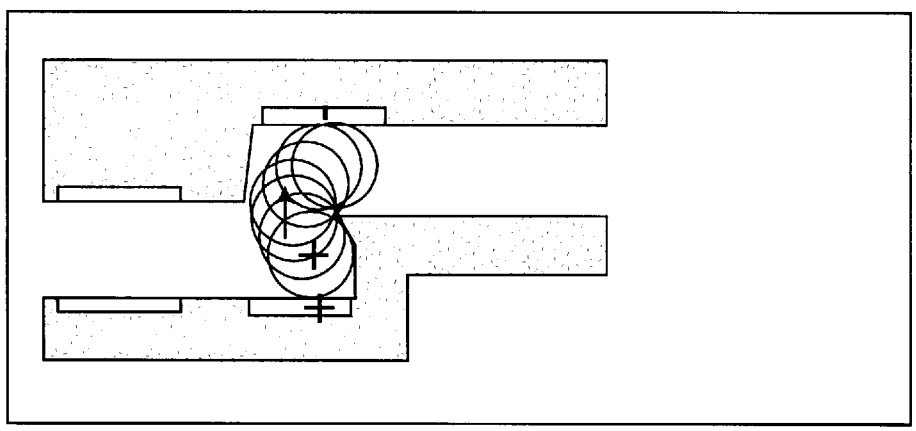
Figure 1A:
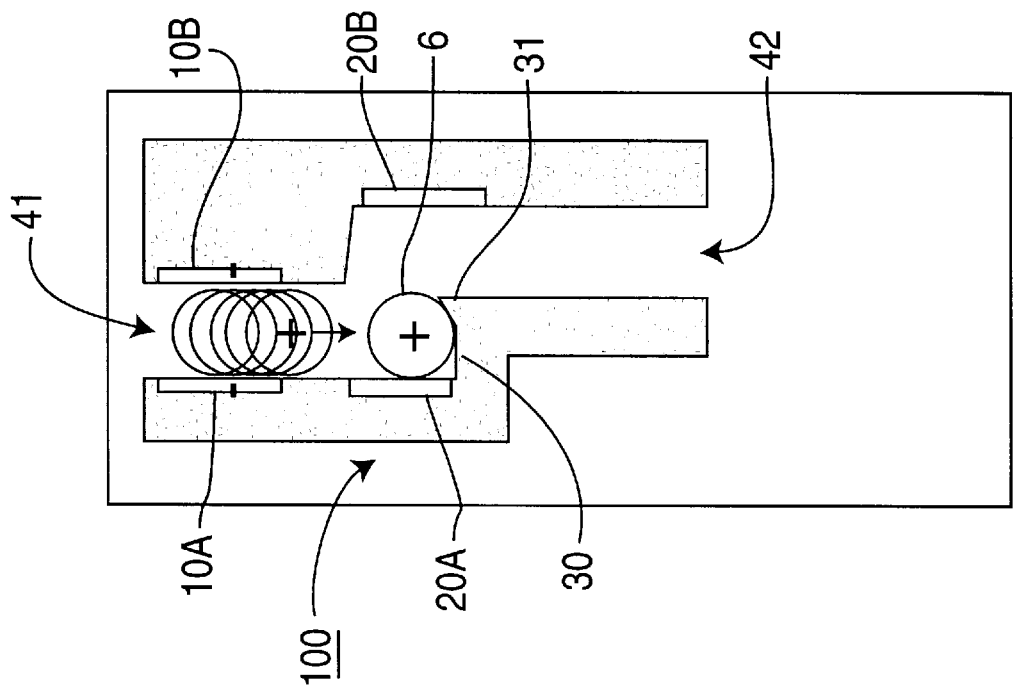

A first embodiment dispenser 100 is illustrated in FIGS. 1A–1C. A bead 6 can be, for example, positively charged by inducing a charge by operating first alpha electrode 10A and second alpha electrode 10B at a relatively high positive potential while the bead passes through feeder channel 41 and between these two electrodes. Alternatively, the beads can be triboelectrically charged, for instance by a triboelectric charging protocol applied prior to a bead's insertion into feeder channel 41, or through contact with an appropriate material lining the upper reaches of feeder channel 41. The now positively charge bead 6 falls towards bead selection escapement 30, which is defined by rim 31. The bead 6 comes to rest on bead selection escapement 30. If needed the potentials at first beta electrode 20A and second beta electrode 20B can be set to favor the bead 6 settling in bead selection escapement 30 over falling into dispenser channel 42. FIG. 1B illustrates the operation of first beta electrode 20A and second beta electrode 20B to eject the bead 6 into the dispenser channel 42. If the weight of bead 6 is insufficient to move bead 6 past second beta electrode 20B, which is negatively charged and attracts bead 6, the second beta electrode can then be brought to neutral or positive potential. The term "beads" refers to solids of sufficient mechanical durability to be handled in one of the apparatuses of the invention. While beads are preferably oval or tubular in shape, variations in shape are contemplated. A spherical shape is most preferred.

The electrodes of used to charge and move the bead 6 can be fabricated for example by embedding a suitable conductive material into the substrate used to fabricate the bead dispenser 100. Alternatively, for example, a metallic conductor such as gold or copper can be evaporated at the appropriate location. In a preferred embodiment, the electrodes that are intended only for pushing or pulling a bead 6, such as first and second beta electrodes 20A and 20B, are coated with a nonconductive material such as, for example, a moldable plastic, or sputtered dielectric to limit the charge transfer between the beads 6 and the electrodes. Electrical connections to the electrodes can be through vias in the substrate. For fine-scaled devices, such vias can be formed, for example, using the methodology described in, for example, Zanzucchi et al., U.S. patent application No. 08/556,036, filed Nov. 9, 1995, entitled "Liquid Distribution System," and corresponding PCT Application No. PCT/US95/14590, which applications are incorporated herein by reference in their entirety.

For use in charging a bead, the electrodes will typically, without limitation, be operated at a voltage from about 1,000V to about 10,000V. For pushing or pulling beads, generally, without limitation, voltages in the range of about 500V to about 2,000V are acceptable.

The dispensers and selectors of the invention are suitably used with a wide variety of beads of differing diameters and densities. Preferably, however, each such apparatus will generally be designed for a specific, more narrowly defined, range of bead diameters. Dispensers or selectors are favorably used, for example, with beads of diameters from about 100 mm to about 500 mm, more preferably from about 200 mm to about 300 mm. Of course, the channels in these apparatuses will be sized to accommodate the desired bead size, generally leaving some extra room to assure the free movement of beads within the channels.

The dispensers and selectors of the invention can be, for example, constructed of a variety of dielectric materials such as for example glass, plastic or ceramic. Some plastics may be less desirable than others because of their relatively greater tendency to retain electrostatic charges.

Larger-scaled apparatuses of the invention are conveniently fabricated, for example, by injection molding. Relatively smaller-scaled apparatuses can necessitate the use of more precise methods of forming the channels. For example, the channels can be formed by conventional chemical etching techniques, which function for example on glass and semiconductor substrates, and subsequently enclosed by sealing the substrate to a second substrate using for example an adhesive or a bonding technique such as the technique described in set forth in "Field-Assisted Sealing," U.S. application Ser. No. 60/006588, filed Nov. 9, 1995, and corresponding PCT Application No. 05/95/14654, refiled as Ser. No. 08/745,766, filed Nov. 8, 1996, now U.S. Pat. 5,747,169, issued May 5, 1998, which patent applications and patents are incorporated by reference, in its entirety, into this specification. Additional bonding methods are described, for example, in Jobling-Purser, U.S. Pat. No. 2,620,598, Curlee et al., U.S. Pat. No. 5,009,690, Kleiman, U.S. Pat. No. 4,643,532, Pomerantz, U.S. Pat. No. 3,506,424, Pomerantz et al., U.S. Pat. No 3,417,459, Horne, U.S. Pat. No. 4,294,602 and Wohltjen et al., U.S. Pat. No. 4,452,624. Alternatively, the channels can be formed in multiple layers, with the cavities defining the channels formed in each layer, for example by chemical etching or laser ablation. Chemical etching techniques are described, for example, in Zanzucchi et al., "Liquid Distribution System," Harmon et al., U.S. Pat. No. 5,118,384, Behringer et al., U.S. Pat. No. 4,589,952, Bower, U.S. Pat. No. 4,533,430 and Haskell, U.S. Pat. No. 4,495,025.

Second Embodiment

Figure 2:
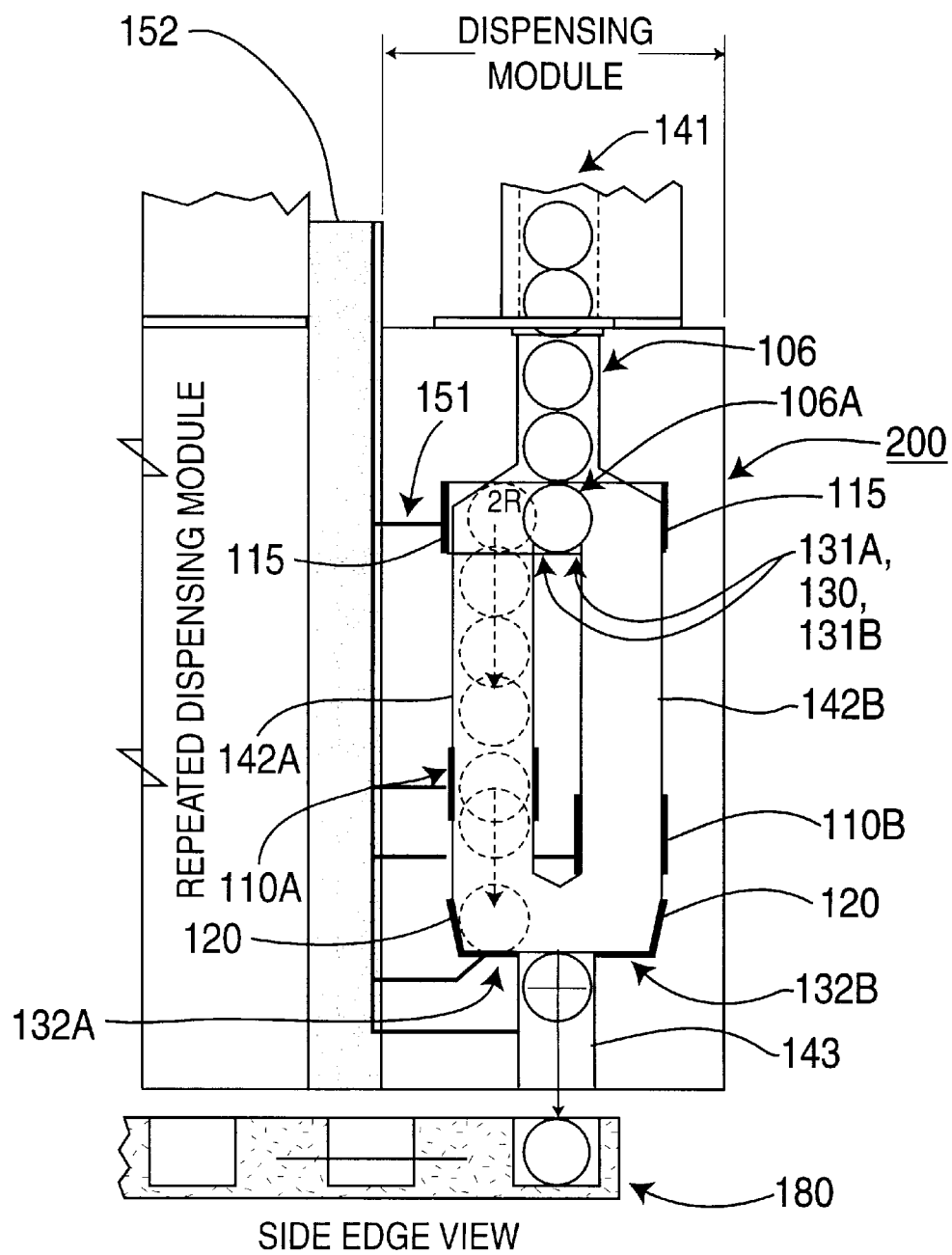
FIG. 2 illustrates an example of the second embodiment bead director.

FIG. 2 illustrates a bead director 200. In the illustrated embodiment, the director 200 incorporates, for example, a dispenser similar to that of Figures 1A–1C, with the bead director function serving to control the presentation of beads to the dispenser. Feeder channel 141 contains a stack of beads 106, with the bottom bead 106A in the stack resting at bead selection escapement 130, defined by rims 131A and 131B. Electrodes 115 adjacent to bead selection escapement 130 are used to push or pull bottom bead 106A into either first selector channel 142A or second selector channel 142B. First retardation electrode 110A and second retardation electrode 110B can be powered with a voltage of the same polarity as bottom bead 106A so as to slow the fall of bottom bead 106A after it has been moved out of bead selection escapement 130. After its operation, the voltage applied to first retardation electrode 110A or second retardation electrode 110B can be grounded to assure that bottom bead 106A falls to either alpha bead selector escapement 132A or beta bead selector escapement 132B. Electrodes 120 adjacent to alpha bead selector escapement 132A or beta bead selector escapement 132B are now operated to push or pull the bottom bead 106A into dispenser channel 143. Electrical leads 151 connect to an electrical interconnect module 152 that contains or connects to electrical control elements used to apply voltage to the various electrodes. The director 200 dispenses beads into tray 180, which can be a bottom plate such as one of those described in Zanzucchi et al., "Liquid Distribution System," U.S. Ser. No. 08/556,036, filed May 31, 1995 (DSRC 12402G); in U.S. Ser. No. 08/730,636, filed Oct. 11, 1996 (DSRC 12385); in U.S. Ser. No. 08/744,386, filed Nov. 7, 1996 (DSRC 12385A); U.S. Ser. No. 08/630, 018, Apr. 9, 1996 (DSRC 12098), and in which documents are hereby incorporated by reference herein in their entirety.

It will be recognized that the selector function represented by bead selection escapement 130, first selector channel 142A, and second selector channel 142B can be used to direct beads into fully separate pathways, rather than pathways that converge into dispenser channel 142 as illustrated in FIG. 2.

Third Embodiment

Figure 3:
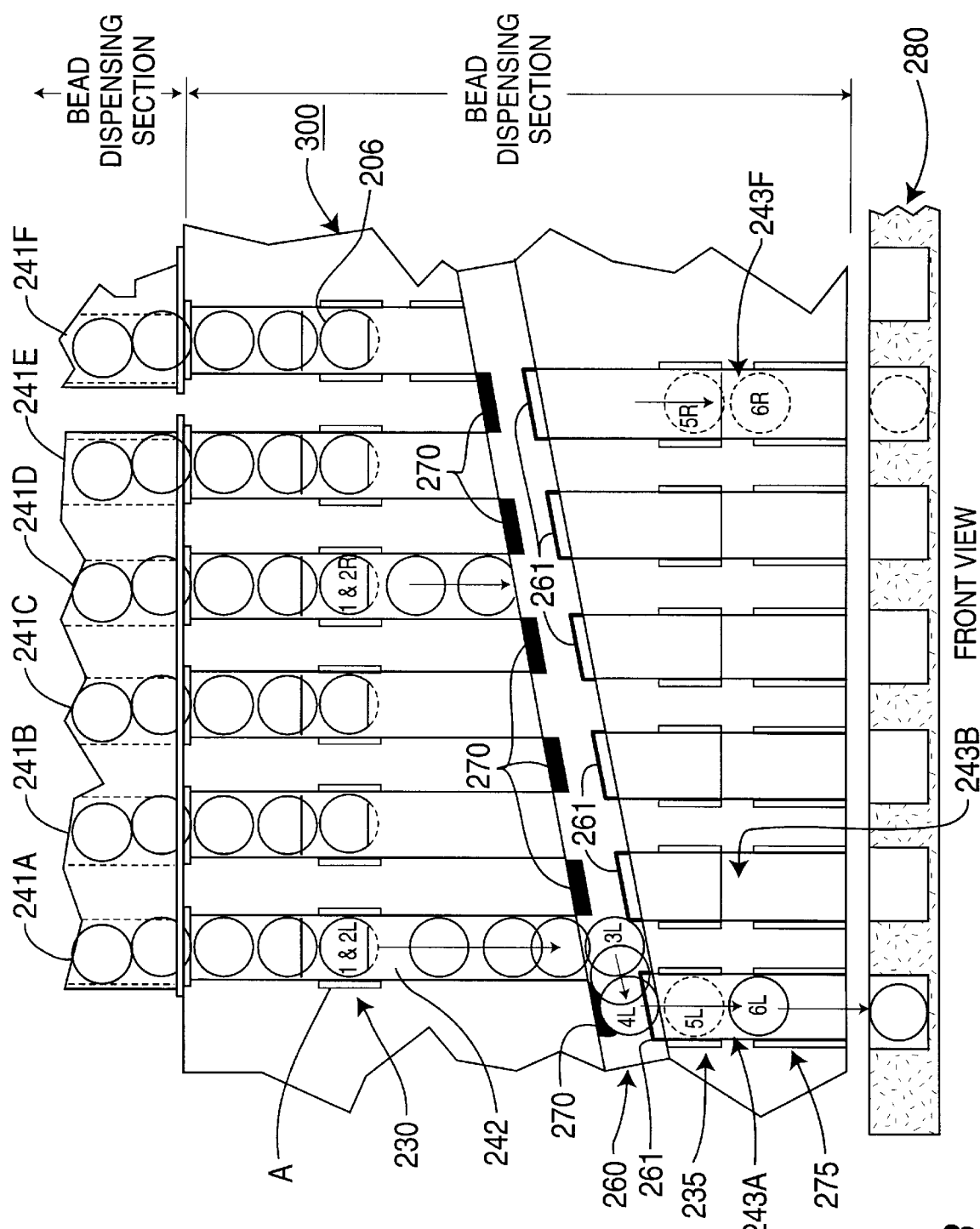
FIG. 3 shows an example of a third embodiment bead selector glideway.

FIG. 3 illustrates a bead selector glideway 300. At position A, first feeder channel 241A, second feeder channel 241B, and so on through sixth feeder channel 241F each have a first bead selection escapement 230. Operation of the bead selection escapement 230 moves a bead 206 into the corresponding intermediate channel 242, where it drops into sloped channel 260, along which the bead slides or rolls. Periodically positioned along sloped channel 260 are first dispenser channel 243A, second dispenser channel 243B, and so on through sixth dispenser channel 243F, each of which can be entered from sloped channel 260 by overcoming a rim 261. Periodically positioned electrodes 270 (positioned to the rear of the illustrated sloped 260 channel) are activated with an appropriate voltage that is attractive or repulsive for the bead 206 to push or pull the bead 206 over the rim 261 at the position of a preselected dispenser channel 243. In the dispenser channel 243, the bead 206 falls to a second bead selection escapement 235. When electronically pushed past second bead selection escapement 235, the fall of the bead 206 can be slowed by retardation electrode 275, before it falls into a well in tray 280.

It will be recognized that where first bead selection escapement 230 operates to split the pathway in two, a second sloped channel 260 can be positioned behind the first, and either be sloped in the same or opposite direction from the first sloped channel 260. In this way, the bead selector glideway 300 can be operated at higher capacity without encountering interference from different beads 206.

Bead formation can, for example, fall into a number of categories. For example, the precursors to the bead can be comminuted to or procured in powder form and then mechanically molded or extruded. Comminution can be done by, for example, the use of a ball will or a jet mill. Polymers such as starch and soluble polymers can be blended into bead forming material to add strength. Porous inert beads (i.e. beads that are not consumed in the chemistry to which they will be exposed) can be loaded with candidate bioactive compounds.

Alternatively, candidate compounds can be covalently attached to porous or nonporous beads, preferable using a cleavable linkage. Beads can be coated with dielectric materials such as, for example moldable plastic or sputtered dielectric, which coating can serve to increase the charge retention of the bead. The beads can be formed from bead-shaped liquids formed for example by atomization or drop ejection. Liquids can be solidified, for example, by polymerization, where typically the liquid contains the needed monomers or initiators, or by freezing. Alternatively, liquids can be encapsulated within a polymer coating.

By fabricating and storing the candidate bioactive agents in bead form, an archival system can accommodate materials with widely varying physico-chemical properties, including differing melting points and viscosities.

The apparatuses containing the bead directors, dispensers and selectors of the invention are preferably operated at a refrigerated temperature to preserve the candidate bioactive agents or, if necessary, maintain beads in frozen form. Such refrigeration places a premium on handling the beads without using many parts than will be more susceptible to corrosion.

The bead handing devices of the invention are preferably designed to dispense bead to plates incorporating a high density of wells, such as a density of wells ranging from about 20 cells per $cm^2$ to about 350 wells per $cm^2$. Preferably, the pitch between cells (i.e. the center-to-center distance) ranges from about 500 mm to about 2500 mm, more preferably from about 900 mm to about 1500 mm.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A bead dispenser for holding a charged bead and selectively dispensing the bead, the dispenser comprising
    a feeder channel having a lower outlet,
    a bead selection escapement with a depression having an outer lip and located below the first lower outlet such that a bead exiting the lower outlet comes to rest in the depression
    a dispenser channel descending from the level of the lip, wherein the lip impedes a bead situated on the bead selection escapement from entering the dispenser channel and
    a first dispensing electrode for creating an electromagnetic potential to electrostatically pull or push the electrostatically charged bead over the rim and into the dispenser channel.

2. The bead dispenser of claim 1, wherein the feeder channel comprises a charging electrode for inducing an electrostatic charge in the bead exiting the lower outlet of the feeder channel.

3. The bead dispenser of claim 1, further comprising a second dispensing electrode at which an electromagnetic potential of polarity opposite that created at the first dispensing electrode can be created thereby causing one of said dispensing electrodes to attract the bead while the other repulses the bead.

4. A bead handling device that is designed to dispense beads to a plurality of wells comprising a bead dispenser according to claim 1 adapted to dispense beads of diameter no greater than 500 mm.

5. A bead director for directing a charged bead to one of a least two selector channels, a first selector channel and a second selector channel, the director comprising a feeder channel having a lower outlet, a bead selection escapement with a depression defined by a lip and located below the lower outlet such that a bead exiting the lower outlet comes to rest in the depression, the first selector channel descending from the level of the lip and in a first direction from the center of the depression, the second selector channel descending from the level of the lip and in a second direction, offset from the first direction, from the center of the depression, and a first electrode for creating an electromagnetic field to electrostatically pull or push the electrostatically charge bead over the rim and into the first or second selector channel.

6. The bead director of claim 5, further comprising a second electrode for creating an electromagnetic field to pull or push the bead over the rim and into the first or second selector channel.

7. The bead director of claim 6, wherein the first and second electrodes can be oppositely charged to increase the electromagnetic forces directing a bead to either the first selector channel or second selector channel.

8. The bead director of claim 5, wherein the first and second selector channels are on opposite sides of the bead selection escapement.

9. The bead director of claim 5, wherein the feeder channel comprises a charging electrode for inducing an electrostatic charge in the bead exiting the lower outlet of the feeder channel.

10. The bead selector of claim 5, further comprising a controller connected to the director for controlling the electric potential at each said electrode and thereby controlling the directing of a bead to a particular selector channel.

11. A bead handling device that is designed to dispense beads to a plurality of wells comprising a bead director according to claim 5 adapted to dispense beads into wells of a plate having said wells at a density of about 20 wells per $cm^2$ to about 350 wells per $cm^2$.

12. A bead selector glideway for directing an electrostatically charged bead into one of at least two dispenser channels, the selector glideway comprising a sloped channel having an angle of descent sufficient to cause beads inserted into the sloped channel to slide or roll down the sloped channel, wherein the sloped channel has a first outlet opening and a second outlet opening, a supply channel that supplies beads into the sloped channel at a part of the sloped channel where the bottom of the sloped channel has a higher elevation than it does at the locations of either the first outlet opening or the second outlet opening, a first dispenser channel and second dispenser channel for each of the first outlet opening and second outlet opening, respectively, the first dispenser channel descending from the first outlet opening and the second dispenser channel descending from the second outlet opening, one or more first electrodes for, when activated, electrostatically pushing or pulling a bead to divert the electrostatically charged bead from proceeding down the sloped channel and into the first dispenser channel, one or more second electrodes for, when activated, electrostatically pushing or pulling a bead to divert the electrostatically charged bead from proceeding down the sloped channel and into the second dispenser channel.

13. The bead selector glideway of claim 12, wherein the angle of descent is offset by from about 15° to about 45° from horizontal.

14. The bead selector glideway of claim 12, wherein the first electrodes comprise an alpha first electrode and a beta first electrode wherein the alpha first electrode has a positive potential and the beta first electrode has a negative potential such that one of these first electrodes will attract a bead in the selector glideway and the other will repel such a bead to push or pull the bead into the first selector channel.

15. A bead handling device that is designed to dispense beads to a plurality of wells comprising a bead selector glideway according to claim 12 adapted to dispense beads into wells of a plate having said wells at a density of about 20 wells per $cm^2$ to about 350 wells per $cm^2$.

16. The bead handling device of claim 15, further comprising a bead director comprising:

a feeder channel having a lower outlet, a bead selection escapement with a depression defined by a lip and located below the lower outlet such that a bead exiting the lower outlet comes to rest in the depression, said supply channel descending from the level of the lip and in a first direction from the center of the depression, a second supply channel descending from the level of the lip and in a second direction, offset from the first direction, from the center of the depression, and a third electrode for creating an electromagnetic field electrostatically to pull or push the electrostatically charged bead over the lip and into the first or second selector channel.

17. The bead handling device of claim 15 further comprising a bead dispenser comprising:

a feeder channel having a lower outlet, a bead selection escapement with a depression having an outer lip and located below the first lower outlet such that a bead exiting the lower outlet comes to rest in the depression, said supply channel descending from the level of the lip, wherein the lip impedes a bead situated on the bead selection escapement from entering the dispenser channel and a first dispensing electrode for creating an electromagnetic potential to electrostatically pull or push the electrostatically charged bead over the lip and into the supply channel.

* * * * *